(12) United States Patent
Isoyama et al.

(10) Patent No.: US 12,155,504 B2
(45) Date of Patent: Nov. 26, 2024

(54) DETECTION DEVICE, IN-VEHICLE SYSTEM, AND DETECTION METHOD

(71) Applicant: SUMITOMO ELECTRIC INDUSTRIES, LTD., Osaka (JP)

(72) Inventors: Yoshikazu Isoyama, Osaka (JP); Kunito Fukuda, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 275 days.

(21) Appl. No.: 17/783,445

(22) PCT Filed: Sep. 9, 2020

(86) PCT No.: PCT/JP2020/034126
§ 371 (c)(1),
(2) Date: Jun. 8, 2022

(87) PCT Pub. No.: WO2021/140703
PCT Pub. Date: Jul. 15, 2021

(65) Prior Publication Data
US 2023/0010621 A1    Jan. 12, 2023

(30) Foreign Application Priority Data
Jan. 9, 2020  (JP) ................. 2020-002244

(51) Int. Cl.
*H04L 12/40*    (2006.01)

(52) U.S. Cl.
CPC .... *H04L 12/40* (2013.01); *H04L 2012/40215* (2013.01); *H04L 2012/40273* (2013.01)

(58) Field of Classification Search
CPC .......... H04L 12/40; H04L 2012/40215; H04L 2012/40273; H04L 12/40026
See application file for complete search history.

(56) References Cited

U.S. PATENT DOCUMENTS

2008/0043629 A1    2/2008  Hofman
2010/0082805 A1*   4/2010  Orton ................. H04L 43/0805
                                                     709/224

(Continued)

FOREIGN PATENT DOCUMENTS

CN    104228715 A    12/2014
CN    109765878 A     5/2019

(Continued)

OTHER PUBLICATIONS

Yuta Atobe et al. "A Study On Detecting In-Vehicle Network Connections of Unauthorized Devices Using TDR". 2019 Symposium on Cryptography and Information Security, The Institute of Electronics, Information and Communication Engineers.

*Primary Examiner* — Luat Phung
(74) *Attorney, Agent, or Firm* — Oliff PLC

(57) ABSTRACT

A detection device to be used in an in-vehicle network including a CAN (Controller Area Network) bus and a plurality of function units connected to the CAN bus includes: a measurement unit configured to measure a signal waveform of a frame transmitted in the CAN bus; a calculation unit configured to calculate a plurality of kinds of feature amounts of the signal waveform measured by the measurement unit; and a detection unit configured to detect an abnormality regarding the CAN bus, based on each of the feature amounts calculated by the calculation unit.

6 Claims, 12 Drawing Sheets

(56) References Cited

U.S. PATENT DOCUMENTS

| | | | |
|---|---|---|---|
| 2014/0380416 A1 | 12/2014 | Adachi | |
| 2017/0134358 A1* | 5/2017 | Takada | H04W 12/069 |
| 2018/0248766 A1 | 8/2018 | Ezra et al. | |
| 2018/0331853 A1* | 11/2018 | Fredriksson | G06F 13/42 |
| 2018/0367335 A1* | 12/2018 | Mizutani | H04L 65/00 |
| 2019/0378356 A1* | 12/2019 | Fang | G07C 5/008 |
| 2019/0385057 A1 | 12/2019 | Litichever et al. | |
| 2021/0328931 A1* | 10/2021 | Xian | H04L 67/12 |
| 2022/0294638 A1* | 9/2022 | Quigley | G06F 18/22 |

FOREIGN PATENT DOCUMENTS

| | | |
|---|---|---|
| EP | 3565188 A2 | 11/2019 |
| JP | 2009-302783 A | 12/2009 |
| JP | 2011-223154 A | 11/2011 |

\* cited by examiner

DETECTION DEVICE, IN-VEHICLE SYSTEM, AND DETECTION METHOD

TECHNICAL FIELD

The present disclosure relates to a detection device, an in-vehicle system, and a detection method.

This application claims priority on Japanese Patent Application No. 2020-2244 filed on Jan. 9, 2020, the entire content of which is incorporated herein by reference.

BACKGROUND ART

PATENT LITERATURE 1 discloses a detection method as follows. That is, the detection method is for detecting a failure of a network component having a failure in a bus network including two or more transmitters, and includes a step of transmitting a first signal of a predetermined parameter from a first transmitter, out of the two or more transmitters, to the bus network; a step of receiving a first signal by at least one receiver; and a step of determining whether the first signal is followed by a first tail that is an echo indicating a network component having a failure.

NON PATENT LITERATURE 1 discloses a technology in which impedance of a network is observed by using a TDR (Time Domain Reflectometry) technology, whereby a connection of an unauthorized apparatus is detected.

CITATION LIST

Patent Literature

PATENT LITERATURE 1: US Patent Application Publication No. 2008/0043629

Non Patent Literature

NON PATENT LITERATURE 1: Yuta Atobe and three others, "A Study on Detecting In-Vehicle Network Connections of Unauthorized Devices Using TDR", 2019 Symposium on Cryptography and Information Security, The Institute of Electronics, Information and Communication Engineers

SUMMARY OF THE INVENTION

A detection device of the present disclosure is a detection device to be used in an in-vehicle network including a CAN (Controller Area Network) bus and a plurality of function units connected to the CAN bus. The detection device includes: a measurement unit configured to measure a signal waveform of a frame transmitted in the CAN bus; a calculation unit configured to calculate a plurality of kinds of feature amounts of the signal waveform measured by the measurement unit; and a detection unit configured to detect an abnormality regarding the CAN bus, based on each of the feature amounts calculated by the calculation unit.

An in-vehicle system of the present disclosure includes: a plurality of function units connected to a CAN bus; and a detection device. Each function unit transmits a frame to another function unit via the CAN bus. The detection device measures a signal waveform of the frame transmitted in the CAN bus. The detection device calculates a plurality of kinds of feature amounts of the measured signal waveform. The detection device detects an abnormality regarding the CAN bus, based on each of the calculated feature amounts.

A detection method of the present disclosure is a detection method to be performed in a detection device to be used in an in-vehicle network including a CAN bus and a plurality of function units connected to the CAN bus. The detection method includes the steps of: measuring a signal waveform of a frame transmitted in the CAN bus; calculating a plurality of kinds of feature amounts of the measured signal waveform; and detecting an abnormality regarding the CAN bus, based on each of the calculated feature amounts.

One mode of the present disclosure can be realized not only as a detection device that includes such a characteristic processing unit but also as a semiconductor integrated circuit that realizes a part or the entirety of the detection device. One mode of the present disclosure can be realized not only as an in-vehicle system that includes such a characteristic processing unit, but also as a method that includes such characteristic process steps, as well as a semiconductor integrated circuit that realizes a part or the entirety of the in-vehicle system.

DETAILED DESCRIPTION

Figure 1:
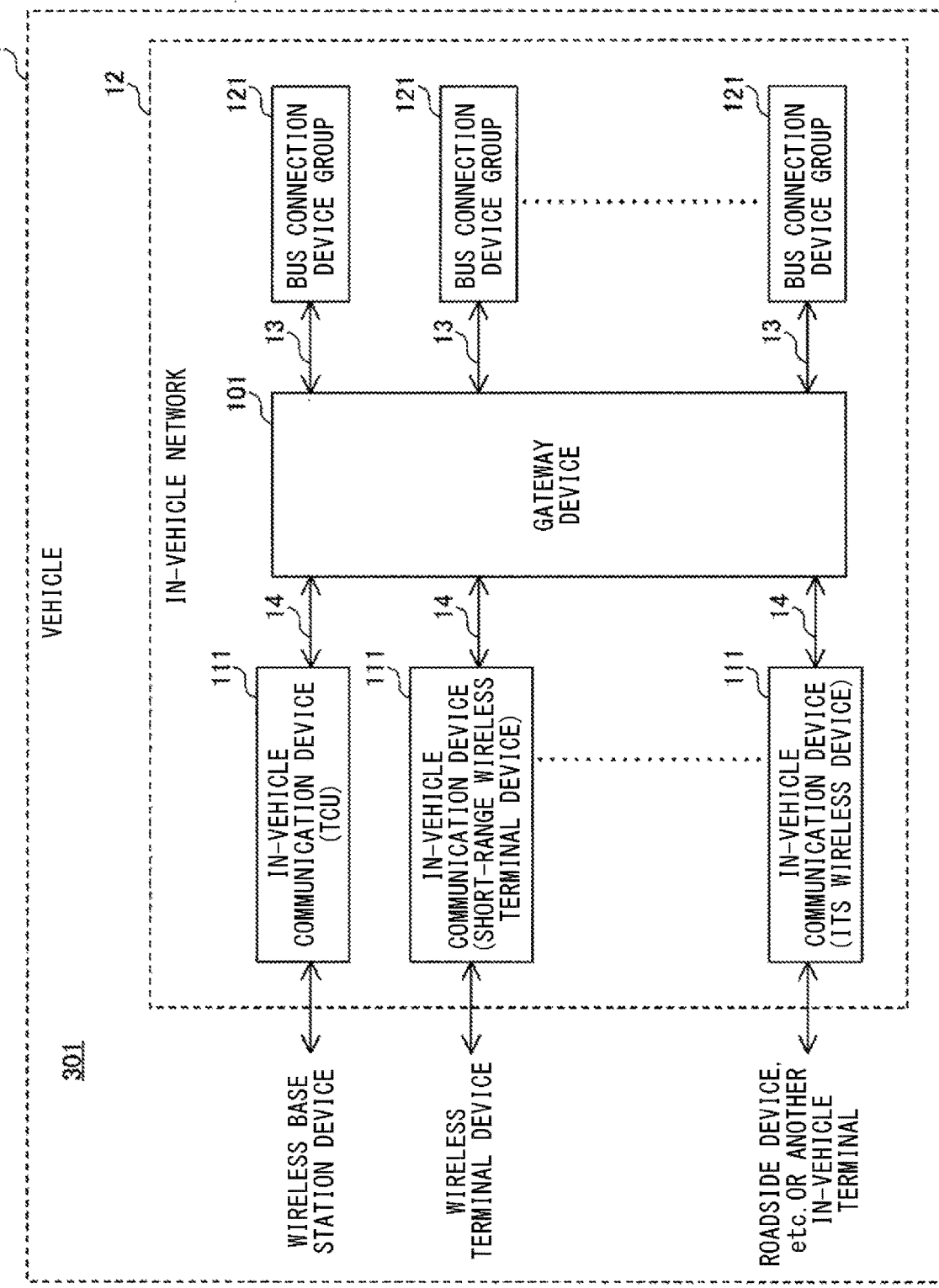
FIG. 1 shows a configuration of an in-vehicle communication system according to an embodiment of the present disclosure.

To date, technologies for improving security in networks have been developed.

Problems to be Solved by the Present Disclosure

Beyond the technologies described in PATENT LITERATURE 1 and NON PATENT LITERATURE 1, there is a desire for a technology that can more accurately detect an abnormality regarding a CAN bus in an in-vehicle network, with a simple configuration.

The present disclosure has been made in order to solve the above problem. An object of the present disclosure is to provide a detection device, an in-vehicle system, and a detection method that can more accurately detect an abnormality regarding a CAN bus in an in-vehicle network, with a simple configuration.

Effects of the Present Disclosure

According to the present disclosure, an abnormality regarding a CAN bus in an in-vehicle network can be more accurately detected with a simple configuration.

DESCRIPTION OF EMBODIMENT OF THE PRESENT DISCLOSURE

First, contents of an embodiment of the present disclosure are listed and described.

(1) A detection device according to the embodiment of the present disclosure is a detection device to be used in an in-vehicle network including a CAN (Controller Area Network) bus and a plurality of function units connected to the CAN bus. The detection device includes: a measurement unit configured to measure a signal waveform of a frame transmitted in the CAN bus; a calculation unit configured to calculate a plurality of kinds of feature amounts of the signal waveform measured by the measurement unit; and a detection unit configured to detect an abnormality regarding the CAN bus, based on each of the feature amounts calculated by the calculation unit.

Thus, with the configuration in which feature amounts of the signal waveform of a frame transmitted in a CAN bus are focused on, and a plurality of kinds of feature amounts are calculated to detect an abnormality regarding the CAN bus, it is possible to detect a minute change regarding the CAN bus during, for example, operation without using a device or the like that applies a pulse signal to the CAN bus, for example. Therefore, an abnormality regarding a CAN bus in an in-vehicle network can be more accurately detected with a simple configuration.

(2) Preferably, the detection device further includes an acquisition unit configured to acquire a reference distribution being a distribution of each feature amount that has been generated in advance, and the detection unit detects an abnormality regarding the CAN bus, based on each feature amount calculated by the calculation unit and the reference distribution acquired by the acquisition unit.

With this configuration, the abnormal degree of the feature amounts relative to a normal state can be detected based on the reference distribution generated in advance. Therefore, an abnormality regarding a CAN bus can be detected by a simple process.

(3) Preferably, the calculation unit calculates, as the feature amount, at least two of mean, variance, skewness, kurtosis, irregularity by Krimphoff, irregularity by Jensen, spectrum crest factor, and root mean square, of voltage values obtained by sampling the signal waveform.

With this configuration, an abnormality regarding a CAN bus can be more accurately detected by using various feature amounts.

(4) Preferably, the measurement unit measures a pulse signal waveform in a range from a Control field to a CRC field in the frame.

With this configuration, the pulse signal waveform can be measured at a timing when the possibility of overlapping with a frame from another function unit is low, and thus, an abnormality regarding a CAN bus can be more accurately detected.

(5) Preferably, the measurement unit measures the signal waveform of each of a plurality of the frames respectively transmitted from a plurality of the function units, the calculation unit calculates a plurality of kinds of the feature amounts of each signal waveform measured by the measurement unit, and the detection unit detects an abnormality regarding the CAN bus, based on the plurality of kinds of the feature amounts, of each signal waveform, calculated by the calculation unit.

Detection accuracy of an abnormality in a CAN bus depends on the distance between the place of the abnormality and the connection position of a function unit. With this configuration, detection of an abnormality in a wide area in the CAN bus can be performed.

(6) An in-vehicle system according to the embodiment of the present disclosure includes: a plurality of function units connected to a CAN bus; and a detection device. Each function unit transmits a frame to another function unit via the CAN bus. The detection device measures a signal waveform of the frame transmitted in the CAN bus. The detection device calculates a plurality of kinds of feature amounts of the measured signal waveform. The detection device detects an abnormality regarding the CAN bus, based on each of the calculated feature amounts.

Thus, with the configuration in which feature amounts of the signal waveform of a frame transmitted in a CAN bus are focused on, and a plurality of kinds of feature amounts are calculated to detect an abnormality regarding the CAN bus, it is possible to detect a minute change regarding the CAN bus during, for example, operation without using a device or the like that applies a pulse signal to the CAN bus, for example. Therefore, an abnormality regarding a CAN bus in an in-vehicle network can be more accurately detected with a simple configuration.

(7) A detection method according to the embodiment of the present disclosure is a detection method to be performed in a detection device to be used in an in-vehicle network including a CAN bus and a plurality of function units connected to the CAN bus. The detection method includes the steps of: measuring a signal waveform of a frame transmitted in the CAN bus; calculating a plurality of kinds of feature amounts of the measured signal waveform; and detecting an abnormality regarding the CAN bus, based on each of the calculated feature amounts.

Thus, with the method in which feature amounts of the signal waveform of a frame transmitted in a CAN bus are focused on, and a plurality of kinds of feature amounts are calculated to detect an abnormality regarding the CAN bus, it is possible to detect a minute change regarding the CAN bus during, for example, operation without using a device or the like that applies a pulse signal to the CAN bus, for example. Therefore, an abnormality regarding a CAN bus in an in-vehicle network can be more accurately detected with a simple configuration.

Hereinafter, an embodiment of the present disclosure is described with reference to the drawings. In the drawings, the same or corresponding parts are denoted by the same reference signs, and descriptions thereof are not repeated. At least some parts of the embodiments described below can be combined together as desired.

Configuration and Basic Operation

FIG. 1 shows a configuration of an in-vehicle communication system according to an embodiment of the present disclosure.

With reference to FIG. 1, an in-vehicle system 301 includes a gateway device 101, a plurality of in-vehicle communication devices 111, and a plurality of bus connection device groups 121. The in-vehicle system 301 is installed in a vehicle 1.

Each in-vehicle communication device 111 is connected to the gateway device 101 via a bus 14. The bus 14 is a bus according to a standard of CAN (registered trademark), FlexRay (registered trademark), MOST (Media Oriented Systems Transport) (registered trademark), Ethernet (registered trademark), and LIN (Local Interconnect Network), or the like, for example.

Each bus connection device group 121 is connected to the gateway device 101 via a CAN bus 13 being a bus according to a CAN standard.

An in-vehicle network 12 includes the gateway device 101, the in-vehicle communication devices 111, the bus connection device groups 121, the CAN buses 13, and the buses 14. The in-vehicle network 12 may be configured so as not to include at least one of the gateway device 101, the in-vehicle communication device 111, and the bus 14.

In the in-vehicle network 12, each in-vehicle communication device 111 communicates with an apparatus outside the vehicle 1, for example. Specifically, the in-vehicle communication device 111 is a TCU (Telematics Communication Unit), a short-range wireless terminal device, or an ITS (Intelligent Transport Systems) wireless device, for example.

Figure 2:
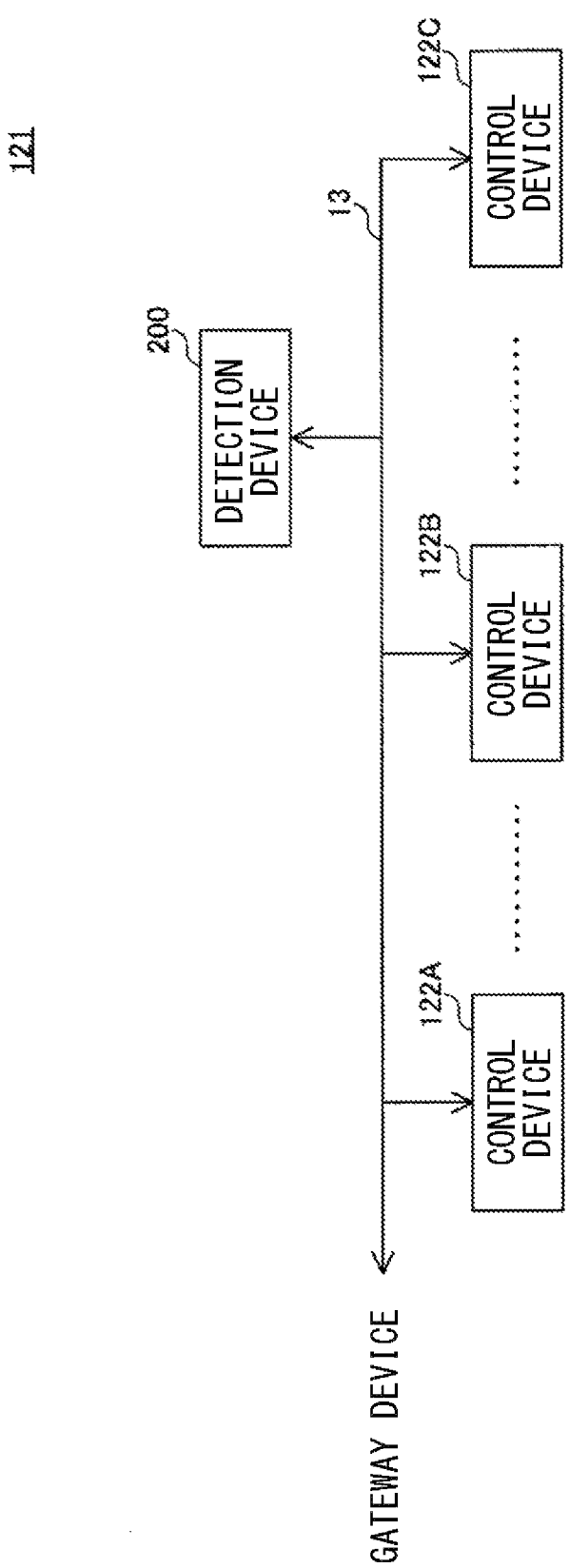
FIG. 2 shows a configuration of a bus connection device group according to the embodiment of the present disclosure.

FIG. 2 shows a configuration of the bus connection device group according to the embodiment of the present disclosure. FIG. 2 shows one CAN bus 13 and a corresponding bus connection device group 121.

With reference to FIG. 2, the bus connection device group 121 includes: a plurality of control devices 122 connected to a corresponding CAN bus 13; and a detection device 200. In the example shown in FIG. 2, the bus connection device group 121 includes control devices 122A, 122B, 122C as the control devices 122. Each control device 122 and the gateway device 101 are examples of a function unit. The control device 122 is an ECU (Electronic Control Unit), for example.

The CAN buses 13 are provided for respective types of systems, for example. Specifically, the CAN buses 13 are implemented as a drive-related bus, a chassis/safety-related bus, a body/electrical-equipment-related bus, and an AV/information-related bus, for example.

The drive-related bus has connected thereto an engine control device, an AT (Automatic Transmission) control device, and an HEV (Hybrid Electric Vehicle) control device, which are examples of the control device 122. The engine control device, the AT control device, and the HEV control device control an engine, AT, and switching between the engine and a motor, respectively.

The chassis/safety-related bus has connected thereto a brake control device, a chassis control device, and a steering control device, which are examples of the control device 122. The brake control device, the chassis control device, and the steering control device control a brake, a chassis, and steering, respectively.

The body/electrical-equipment-related bus has connected thereto an instrument indication control device, an air conditioner control device, a burglar prevention control device, an air bag control device, and a smart entry control device, which are examples of the control device 122. The instrument indication control device, the air conditioner control device, the burglar prevention control device, the air bag control device, and the smart entry control device control instruments, an air conditioner, a burglar prevention mechanism, an air bag mechanism, and smart entry, respectively.

The AV/information-related bus has connected thereto a navigation control device, an audio control device, an ETC (Electronic Toll Collection System) (registered trademark) control device, and a telephone control device, which are examples of the control device 122. The navigation control device, the audio control device, the ETC control device, and the telephone control device control a navigation device, an audio device, an ETC device, and a mobile phone, respectively.

The bus connection device group 121 may be configured to include a device, other than the control devices 122 and the detection device 200, that is connected to the CAN bus 13.

A control device 122 transmits a frame to another control device 122 or the gateway device 101 via a CAN bus 13. Hereinafter, a frame transmitted in a CAN bus is also referred to as a CAN frame.

Figure 3:
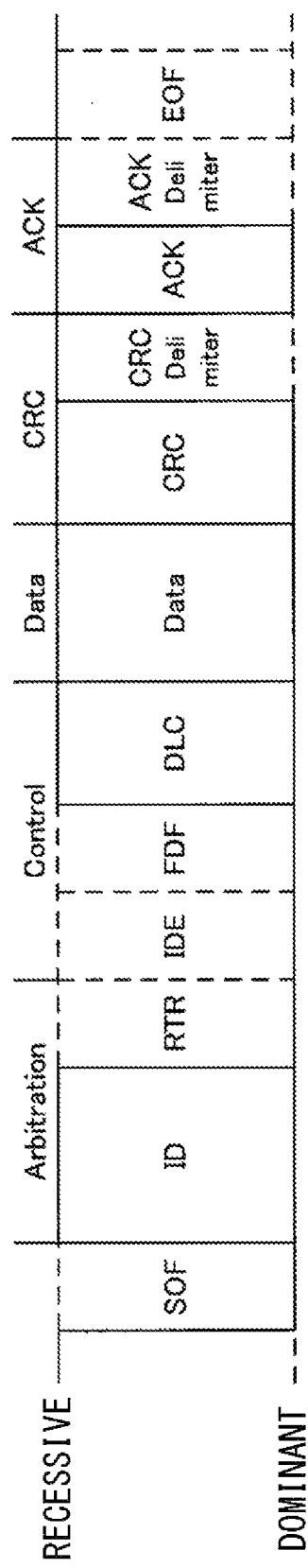
FIG. 3 shows an example of a CAN frame transmitted in a CAN bus according to the embodiment of the present disclosure.

FIG. 3 shows an example of a CAN frame transmitted in a CAN bus according to the embodiment of the present disclosure.

With reference to FIG. 3, a CAN frame has SOF (Start Of Frame), an Arbitration field, a Control field, a Data field, a CRC (Cyclic Redundancy Check) field, an ACK (Acknowledgement) field, and EOF (End Of Frame).

The Arbitration field has ID and RTR (Remote Transmission Request). The Control field has IDE (Identifier Extension), FDF (FD Format), and DLC (Data Length Code). The CRC field has CRC and CRC Delimiter. The ACK field has ACK and ACK Delimiter.

Figure 4:
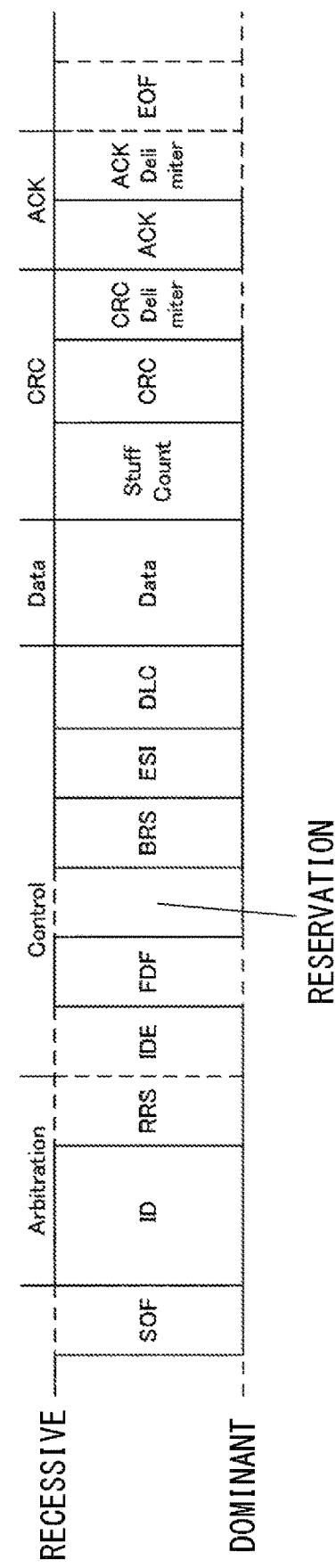
FIG. 4 shows another example of a frame transmitted in a CAN bus according to the embodiment of the present disclosure.

FIG. 4 shows another example of a frame transmitted in a CAN bus according to the embodiment of the present disclosure.

With reference to FIG. 4, this CAN frame has the same field configuration as that of the CAN frame shown in FIG. 3. The Arbitration field has ID and RRS (Remote Request Substitution). The Control field has IDE, FDF, reservation bit, BRS (Bit Rate Indicator), ESI (Error State Indicator), and DLC. The CRC field has Stuff Count, CRC, and CRC Delimiter. The ACK field has ACK and ACK Delimiter.

With reference to FIG. 1 again, the gateway device 101 is a central gateway (CGW), for example, and can communicate with another in-vehicle device.

The gateway device 101 performs a relay process of relaying information transmitted/received between control devices 122 that are connected to different CAN buses 13 in the vehicle 1, information transmitted/received between in-vehicle communication devices 111, and information transmitted/received between a control device 122 and an in-vehicle communication device 111, for example.

Detection Device

Figure 5:
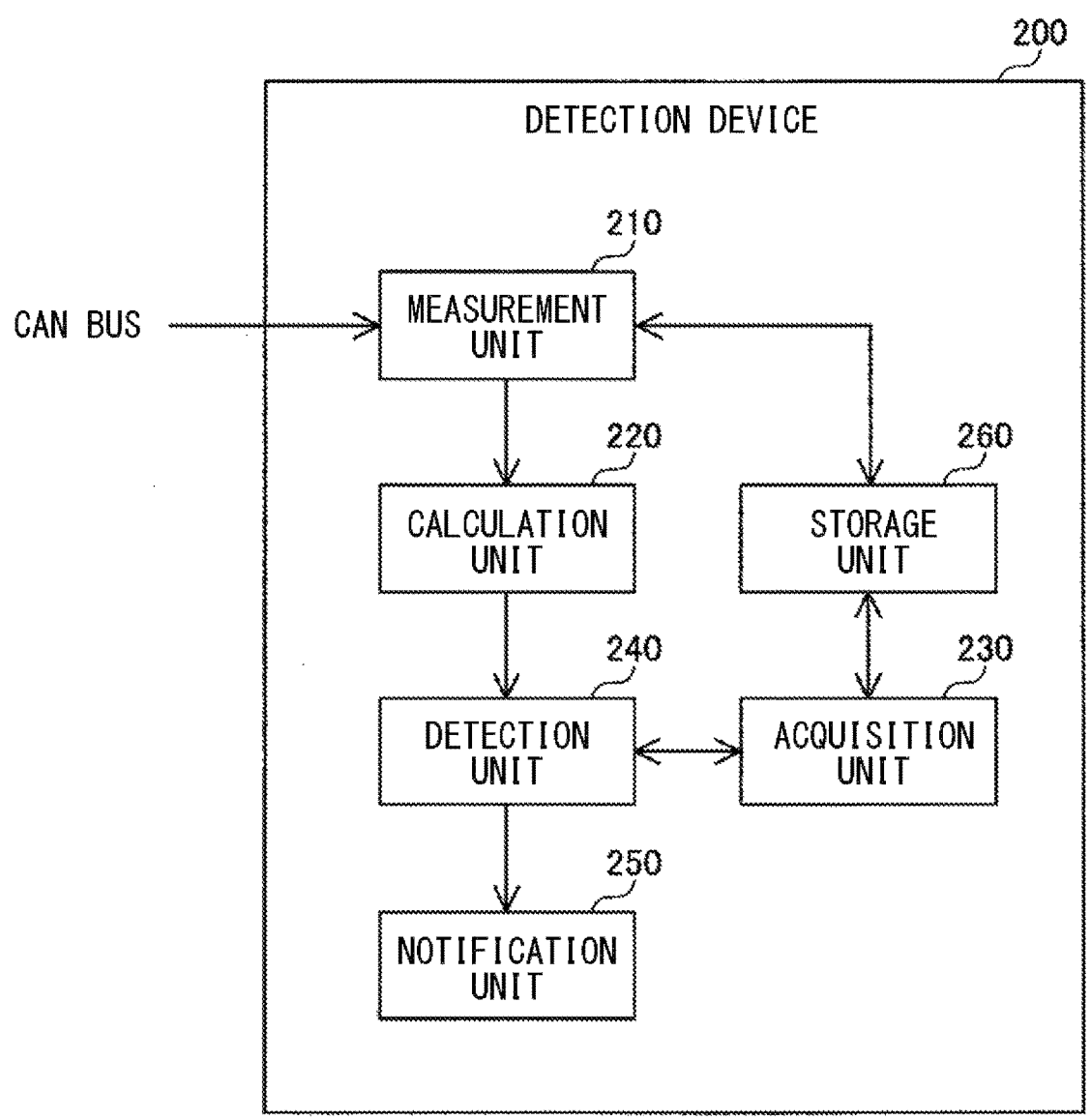
FIG. 5 shows a configuration of a detection device according to the embodiment of the present disclosure.

FIG. 5 shows a configuration of the detection device according to the embodiment of the present disclosure.

With reference to FIG. 5, the detection device 200 includes a measurement unit 210, a calculation unit 220, an acquisition unit 230, a detection unit 240, a notification unit 250, and a storage unit 260.

The measurement unit 210, the calculation unit 220, the acquisition unit 230, the detection unit 240, and the notification unit 250 are each realized by a processor such as a CPU (Central Processing Unit) or a DSP (Digital Signal Processor), for example. The storage unit 260 is a nonvolatile memory, for example.

The detection device 200 is used in the in-vehicle network 12 including a CAN bus 13 and a plurality of function units connected to the CAN bus 13, and performs a detection process of detecting an abnormality regarding the CAN bus 13. For example, the detection device 200 performs the detection process every time a user of the vehicle 1 turns on an accessory power supply or an ignition power supply. The detection device 200 may be configured to perform the detection process periodically or non-periodically after a power supply of the vehicle 1 is turned on, until the power supply is turned off, for example.

Measurement Unit

The measurement unit 210 measures a signal waveform of a CAN frame transmitted in the CAN bus 13.

For example, the CAN bus 13 is a twisted-pair wire composed of a high-voltage-side bus and a low-voltage-side bus. The signal waveform of the CAN frame transmitted in the CAN bus 13 is a pulse signal waveform in which a difference voltage Vd between the voltage of the high-voltage-side bus and the voltage of the low-voltage-side bus is zero V or 2 V.

The measurement unit 210 measures the signal waveform of the CAN frame by sampling the difference voltage Vd in the CAN bus 13 in accordance with a predetermined sampling cycle, in the detection process.

Figure 6:
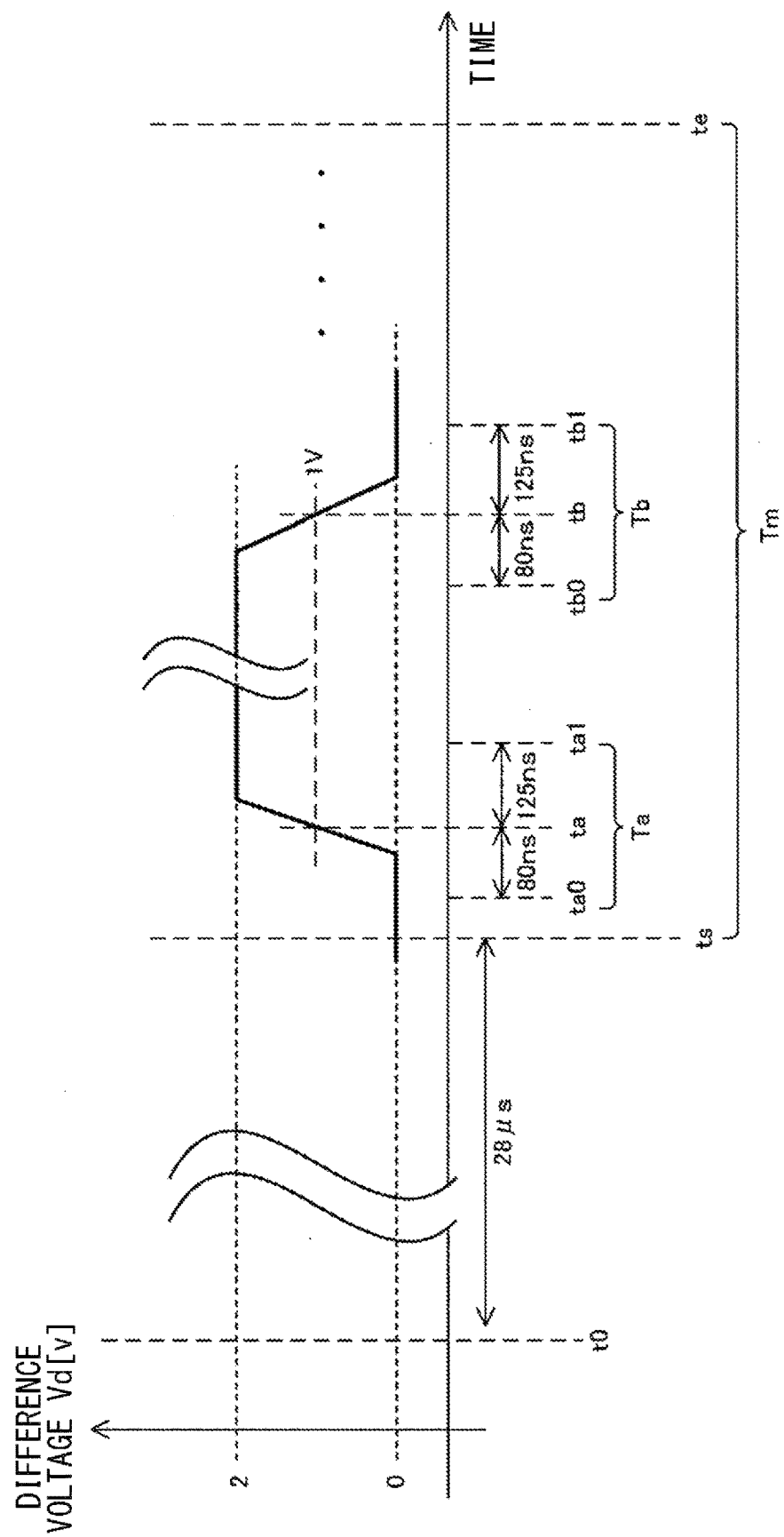
FIG. 6 shows an example of a signal waveform of a CAN frame transmitted in a CAN bus according to the embodiment of the present disclosure.

FIG. 6 shows an example of the signal waveform of a CAN frame transmitted in a CAN bus according to the embodiment of the present disclosure.

With reference to FIG. 6, the measurement unit 210 detects SOF of a CAN frame transmitted from a certain control device 122, by monitoring the difference voltage Vd in the CAN bus 13. Upon detecting SOF of the CAN frame, the measurement unit 210 sets a measurement period Tm, based on the detection timing of the SOF, and samples the difference voltage Vd in the measurement period Tm.

For example, the measurement unit 210 measures the pulse signal waveform in a range from the Control field to the CRC field in the CAN frame. More specifically, the measurement unit 210 samples the difference voltage Vd in a rising period of the signal waveform and the difference voltage Vd in a falling period of the signal waveform in a range from the Control field to the CRC field in the CAN frame.

Here, the data transfer rate in the CAN bus 13 is 500 kbps, for example. The data length of the Arbitration field being the field between SOF and the Control field in the CAN frame is 12 bits.

Thus, when the measurement unit 210 has detected SOF of the CAN frame at a time t0, the measurement unit 210 samples the difference voltage Vd in the rising period of the signal waveform and the difference voltage Vd in the falling period of the signal waveform, in the measurement period Tm being the period between a time ts, which is after 28μ seconds from the time t0 and which is the time period required for transferring 14 bits data, for example, and a time to after a predetermined time period from the time ts.

The measurement unit 210 stores, into the storage unit 260, a plurality of pieces of sampling data Vsmp obtained by sampling the difference voltage Vd in the measurement period Tm.

Then, based on the sampling data Vsmp in the storage unit 260, the measurement unit 210 detects a time ta at which the difference voltage Vd has risen from zero V to 1 V in the measurement period Tm.

Out of the plurality of pieces of sampling data Vsmp in the storage unit 260, the measurement unit 210 selects a piece of sampling data Vsmp of the difference voltage Vd in a target period Ta being the period between a time ta0, which is 80 n seconds before the time ta, and a time ta1, which is 125 n seconds after the time ta. Hereinafter, the sampling data Vsmp, of the difference voltage Vd in the target period Ta, selected by the measurement unit 210 is also referred to as target data Sa.

Similarly, based on the sampling data Vsmp in the storage unit 260, the measurement unit 210 detects a time tb at which the difference voltage Vd has fallen from 2 V to 1 V in the measurement period Tm.

Out of the plurality of pieces of sampling data Vsmp in the storage unit 260, the measurement unit 210 selects a piece of sampling data Vsmp of the difference voltage Vd in a target period Tb being the period between a time tb0, which is 80 n seconds before the time tb, and a time tb1, which is 125 n seconds after the time tb. Hereinafter, the sampling data Vsmp, of the difference voltage Vd in the target period Tb, selected by the measurement unit 210 is also referred to as target data Sb.

For example, upon detecting SOF of a certain CAN frame, the measurement unit 210 selects one set of target data Sa, Sb from the plurality of pieces of sampling data Vsmp in the CAN frame, as described above.

In addition, the measurement unit 210 acquires ID of the control device 122 being the transmission source of the CAN frame transmitted in the CAN bus 13. More specifically, the measurement unit 210 acquires ID in the Arbitration field in the CAN frame to be measured.

The measurement unit 210 generates measurement information including the acquired ID and the selected target data Sa, Sb, and outputs the generated measurement information to the calculation unit 220.

For example, the measurement unit 210 measures the signal waveform of each of a plurality of CAN frames respectively transmitted from a plurality of control devices 122.

More specifically, the measurement unit 210 selects target data Sa, Sb from the sampling data Vsmp of the difference voltage Vd in a CAN frame transmitted from the control device 122A, and generates measurement information MA including ID of the control device 122A and the selected target data Sa, Sb.

The measurement unit 210 selects target data Sa, Sb from the sampling data Vsmp of the difference voltage Vd in a CAN frame transmitted from the control device 122B, and generates measurement information MB including ID of the control device 122B and the selected target data Sa, Sb.

The measurement unit 210 selects target data Sa, Sb from the sampling data Vsmp of the difference voltage Vd in a CAN frame transmitted from the control device 122C, and generates measurement information MC including ID of the control device 122C and the selected target data Sa, Sb.

Hereinafter, each of the control devices 122A, 122B, 122C being the transmission sources of the CAN frames to be measured is also referred to as a target control device 122.

The measurement unit 210 outputs the generated measurement information MA, MB, MC to the calculation unit 220.

Calculation Unit

The calculation unit 220 calculates a plurality of kinds of feature amounts of the signal waveform of a CAN frame measured by the measurement unit 210.

For example, as the above feature amounts, the calculation unit 220 calculates at least two of mean, variance, skewness, kurtosis, irregularity by Krimphoff, irregularity by Jensen, spectrum crest factor, and root mean square, of voltage values obtained by sampling the signal waveform of the CAN frame.

More specifically, when the calculation unit 220 has received measurement information from the measurement unit 210, the calculation unit 220 performs arithmetic operation using the target data Sa, Sb indicated by the received measurement information, thereby calculating a plurality of kinds feature amounts of the signal waveform of the CAN frame in the target periods Ta, Tb.

Here, the mean as an example of the feature amount is represented by formula (1) below.

[Math. 1]

$$\frac{1}{L}\sum_{h=1}^{L} y_h \quad (1)$$

The variance as an example of the feature amount is represented by formula (2) below.

[Math. 2]

$$\frac{1}{L-1}\sum_{h=1}^{L}(y_h - \bar{y})^2 \quad (2)$$

The skewness as an example of the feature amount is represented by formula (3) below.

[Math. 3]

$$\frac{1}{L}\sum_{h=1}^{L}\left[\frac{y_h - \bar{y}}{\sigma}\right]^3 \quad (3)$$

The kurtosis as an example of the feature amount is represented by formula (4) below.

[Math. 4]

$$\left\{\frac{1}{L}\sum_{h=1}^{L}\left[\frac{y_h - \bar{y}}{\sigma}\right]^4\right\} - 3 \quad (4)$$

The irregularity by Krimphoff as an example of the feature amount is represented by formula (5) below.

[Math. 5]

$$\sum_{h=2}^{L-1}\left|a_h - \frac{a_{h-1} + a_h + a_{h+1}}{3}\right| \quad (5)$$

The irregularity by Jensen as an example of the feature amount is represented by formula (6) below.

[Math. 6]

$$\frac{\sum_{h=1}^{L}(a_h - a_{h+1})}{\sum_{h=1}^{L} a_h^2} \quad (6)$$

The spectrum crest factor as an example of the feature amount is represented by formula (7) below.

[Math. 7]

$$\frac{\max(a(h \in L))}{\frac{1}{h}\sum_{h \in L} a_h} \quad (7)$$

The root mean square as an example of the feature amount is represented by formula (8) below.

[Math. 8]

$$\sqrt{\frac{1}{L}\sum_{h=0}^{L-1} a_h^2} \quad (8)$$

In formula (1) to formula (8), L is the total of the number of voltage values included in the target data Sa, and the number of voltage values included in the target data Sb. yh is the h-th voltage value in the target data Sa, Sb. y bar is the mean value of the voltage values in the target data Sa, Sb. σ is the standard deviation of the voltage values in the target data Sa, Sb. ah indicates the h-th intensity in the spectrum obtained by subjecting voltage values in the target data Sa, Sb to Fourier transform. h is an integer from 1 to L.

Hereinafter, a set of a plurality of kinds of feature amounts calculated by the calculation unit 220 is also referred to as a determination feature amount. The determination feature amount is mean and variance, for example.

For example, for each target control device 122, the calculation unit 220 calculates a determination feature amount of a signal waveform measured by the measurement unit 210.

More specifically, when the calculation unit 220 has received measurement information MA including ID of the control device 122A from the measurement unit 210, the calculation unit 220 performs arithmetic operation using target data Sa, Sb included in the received measurement information MA, thereby calculating a determination feature amount FA of the CAN frame transmitted from the control device 122A, and generating calculation information CA including the calculated determination feature amount FA and ID of the control device 122A.

When the calculation unit 220 has received measurement information MB including ID of the control device 122B from the measurement unit 210, the calculation unit 220 performs arithmetic operation using target data Sa, Sb included in the received measurement information MB, thereby calculating a determination feature amount FB of the CAN frame transmitted from the control device 122B, and generating calculation information CB including the calculated determination feature amount FB and ID of the control device 122B.

When the calculation unit 220 has received measurement information MC including ID of the control device 122C from the measurement unit 210, the calculation unit 220 performs arithmetic operation using target data Sa, Sb included in the received measurement information MC, thereby calculating a determination feature amount FC of the CAN frame transmitted from the control device 122C, and generating calculation information CC including the calculated determination feature amount FC and ID of the control device 122C.

The calculation unit 220 outputs the generated calculation information CA, CB, CC to the detection unit 240.

Acquisition Unit

The acquisition unit 230 acquires a reference distribution being a distribution of each feature amount generated in advance.

For example, the reference distribution is a distribution of a determination feature amount, of signal waveforms of a plurality of CAN frames transmitted from the target control device 122, that has been generated in another device in advance before shipment of the vehicle 1.

For example, as the reference distribution, the acquisition unit 230 acquires a probability density function p(x), of a mixed normal distribution having x as a variable, that is shown in formula (9) below.

[Math. 9]

$$p(x) = \sum_{k=1}^{n} \pi_k N\left(x \mid \mu_k, \sum_k\right) \quad (9)$$

A probability density function N of the k-th multivariate normal distribution in formula (9) is represented by formula (10) below.

[Math. 10]

$$N\left(x \mid \mu_k, \sum_k\right) = \frac{1}{(2\pi)^{\frac{m}{2}}} \frac{1}{\left|\sum_k\right|^{\frac{1}{2}}} \exp\left\{-\frac{1}{2}(x-\mu_k)^T \sum_k^{-1} (x-\mu_k)\right\} \quad (10)$$

Here, x is [x1, x2, x3, . . . xm]. x1, x2, x3, . . . xm are values of each determination feature amount. m is the number of kinds of the feature amount.

n is the number of normal distributions that are mixed. n is a value corresponding to the number of target control devices 122, for example, and is 3, for example. μk is a mean vector of 1 xm in the k-th normal distribution. Sigma k is a variance-covariance matrix of m×m in the k-th normal distribution. πk is the mixing ratio of the probability density function N of the k-th multivariate normal distribution, and satisfies formula (11) below. k is an integer from 1 to n.

[Math. 11]

$$\sum_{k=1}^{n} \pi_k = 1 \quad (11)$$

For example, before shipment of the vehicle 1, the manufacturer of the vehicle 1 generates a distribution of a determination feature amount, which is calculated in the detection device 200 when a control of causing three target control devices 122 to transmit a CAN frame 500 times in total is performed, of signal waveforms of a total of 500 CAN frames transmitted from the three target control devices 122.

Figure 7:
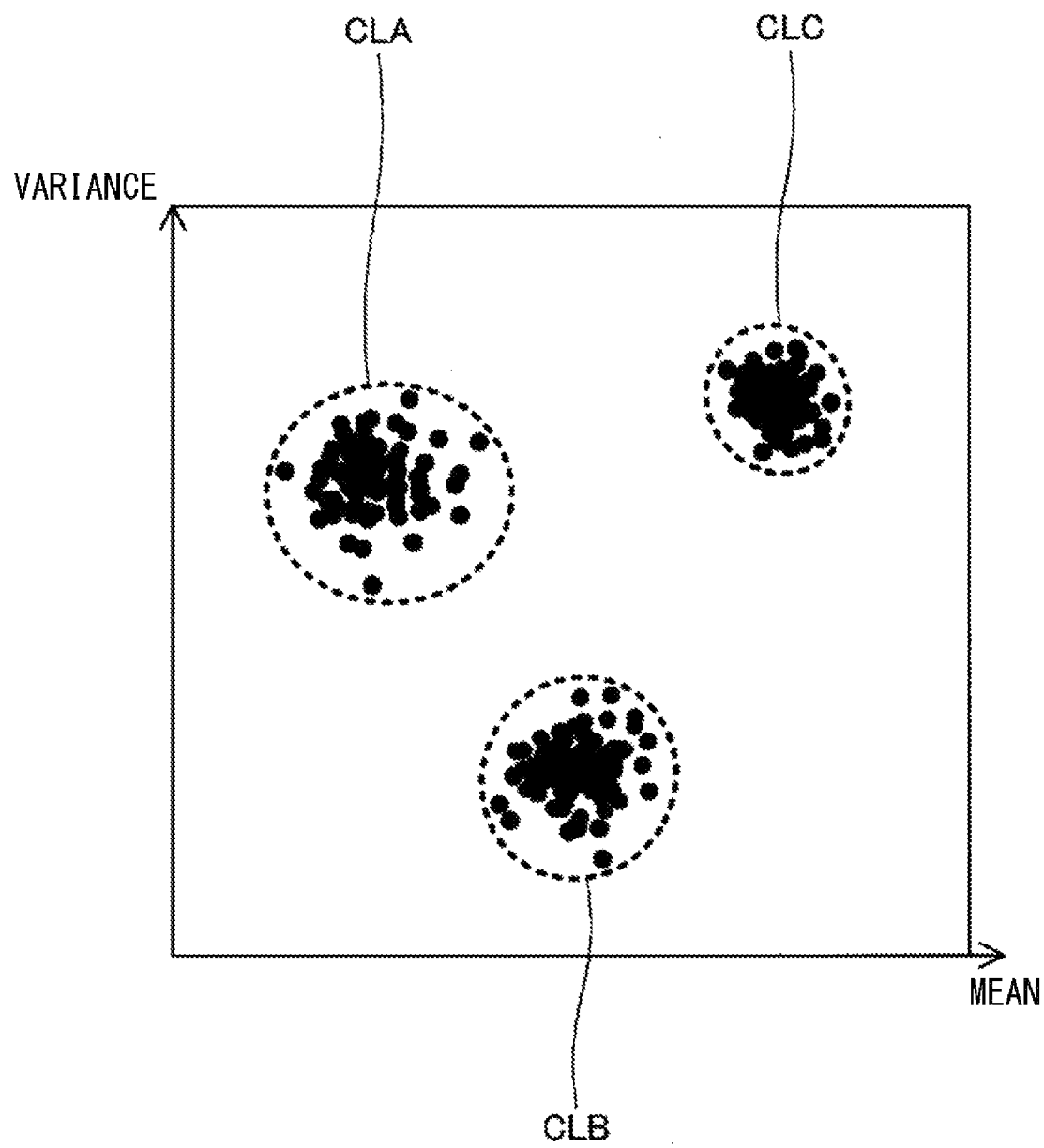
FIG. 7 shows an example of a distribution of a determination feature amount calculated in the detection device according to the embodiment of the present disclosure.

FIG. 7 shows an example of a distribution of a determination feature amount calculated in the detection device according to the embodiment of the present disclosure. FIG. 7 shows a two-dimensional distribution of a determination feature amount composed of two kinds, i.e., "mean" and "variance", as an example of the distribution of the determination feature amount.

With reference to FIG. 7, the two-dimensional distribution of mean and variance, of the signal waveforms of CAN frames, calculated in the detection device 200 has three clusters. The number of clusters in the two-dimensional distribution corresponds to the number of target control devices 122.

Specifically, for example, the cluster formed in a broken line frame CLA corresponds to the distribution of mean and variance of signal waveforms of CAN frames transmitted from the target control device 122A. The cluster formed in a broken line frame CLB corresponds to the distribution of mean and variance of signal waveforms of CAN frames transmitted from the target control device 122B. The cluster formed in a broken line frame CLC corresponds to the distribution of mean and variance of signal waveforms of CAN frames transmitted from the target control device 122C.

The manufacturer of the vehicle 1 generates a probability density function p(x) of a mixed normal distribution by using a GMM (Gaussian Mixture Model), based on the generated two-dimensional distribution. The manufacturer of the vehicle 1 may generate a probability density function p(x) by using a simulation technology, without actually causing the target control devices 122 to transmit CAN frames.

By using the generated probability density function p(x), the manufacturer of the vehicle 1 calculates a score value s, represented by formula (12) below, of the value x of the determination feature amount calculated from 500 CAN frames.

[Math. 12]

$$s = \log(p(x)) \quad (12)$$

Figure 8:
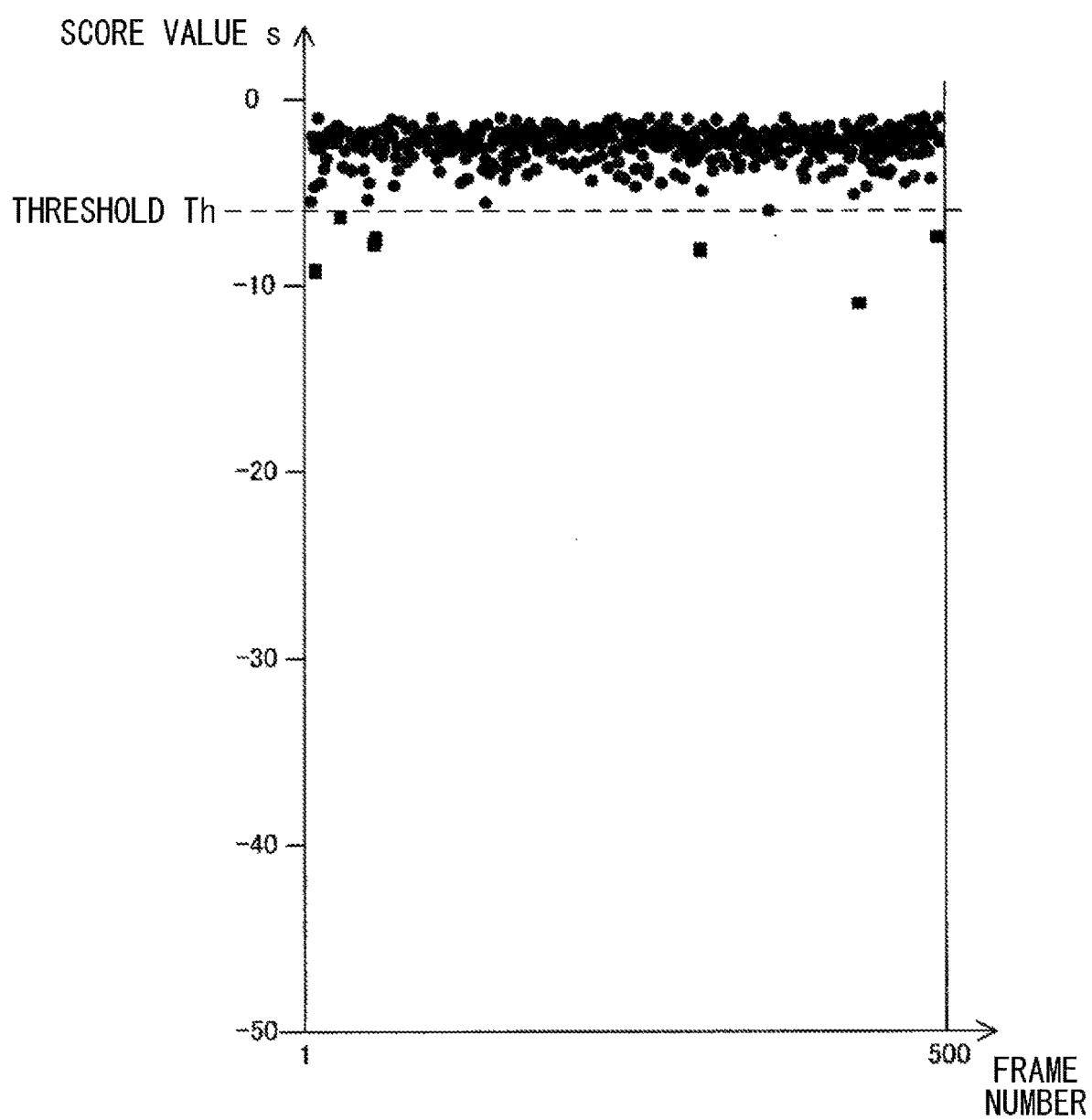
FIG. 8 shows an example of a distribution of score values calculated in the detection device according to the embodiment of the present disclosure.

FIG. 8 shows an example of a distribution of the score values calculated in the detection device according to the embodiment of the present disclosure. In FIG. 8, the vertical axis represents the score value s and the horizontal axis represents the frame number of 1 to 500 assigned to 500 CAN frames.

With reference to FIG. 8, the manufacturer of the vehicle 1 sets a threshold Th for determining that, for example, the lowest 1% in the distribution of 500 score values s corresponding to 500 CAN frames are abnormalities, and registers the set threshold Th into the storage unit 260 in the detection device 200.

When the acquisition unit 230 has received a reference distribution request from the detection unit 240, the acquisition unit 230 acquires the probability density function p(x) and the threshold Th from the storage unit 260 and outputs the probability density function p(x) and the threshold Th to the detection unit 240, as a response to the received reference distribution request.

Detection Unit

The detection unit 240 detects an abnormality regarding the CAN bus 13, based on the determination feature amount calculated by the calculation unit 220.

The detection unit 240 detects: connection of a new apparatus, such as an ECU, a measurement apparatus, or the like, to the CAN bus 13; a physical abnormality of the CAN bus 13 itself; an abnormality of a control device 122; and the like, as abnormalities regarding the CAN bus 13.

More specifically, when the detection unit 240 has received calculation information from the calculation unit 220, the detection unit 240 detects an abnormality regarding the CAN bus 13, based on the received calculation information.

For example, based on the determination feature amount calculated by the calculation unit 220 and the probability density function p(x) acquired by the acquisition unit 230, the detection unit 240 detects an abnormality regarding the CAN bus 13.

For example, based on the probability density function p(x) and a plurality of sets of determination feature amounts calculated for respective target control devices 122 by the calculation unit 220, the detection unit 240 detects an abnormality regarding the CAN bus 13.

More specifically, when the detection unit 240 has received calculation information CA, CB, CC from the calculation unit 220, the detection unit 240 acquires determination feature amounts FA, FB, FC and IDs from the received calculation information CA, CB, CC, respectively. The detection unit 240 outputs a reference distribution request to the acquisition unit 230.

Upon receiving the probability density function p(x) and the threshold Th from the acquisition unit 230, the detection unit 240 calculates three score values s according to formula (9), formula (10), and formula (12), based on the received probability density function p(x) and the respective values x of the determination feature amounts FA, FB, FC.

Then, the detection unit 240 compares the calculated three score values s with the threshold Th received from the acquisition unit 230. When all of the three score values s are not less than the threshold Th, the detection unit 240 determines that no abnormality regarding the CAN bus 13 has occurred. Meanwhile, when at least one of the three score values s is less than the threshold Th, the detection unit 240 determines that an abnormality regarding the CAN bus 13 has occurred.

Figure 9:
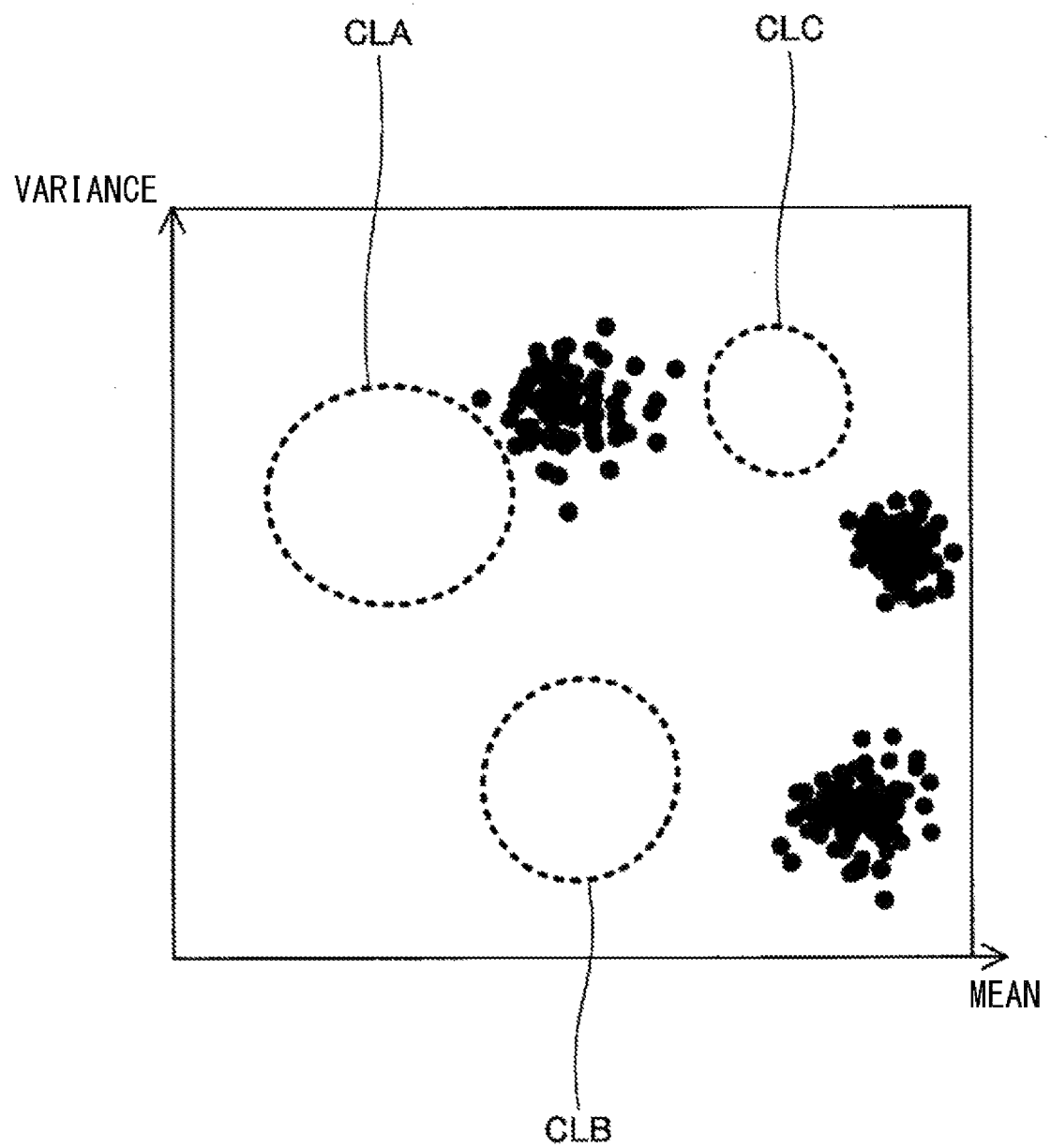
FIG. 9 shows another example of a distribution of a determination feature amount calculated in the detection device according to the embodiment of the present disclosure.

FIG. 9 shows another example of a distribution of a determination feature amount calculated in the detection device according to the embodiment of the present disclosure. FIG. 9 shows a two-dimensional distribution of "mean" and "variance" calculated by the calculation unit 220, in a state where a new apparatus has been connected to the CAN bus 13 after shipment of the vehicle 1. Broken line frames CLA, CLB, CLC in FIG. 9 are the same as the broken line frames CLA, CLB, CLC shown in FIG. 7.

With reference to FIG. 9, when a new apparatus has been connected to the CAN bus 13, the distribution of the determination feature amount calculated by the calculation unit 220 deviates from the broken line frames CLA, CLB, CLC within which the distribution of the determination feature amount in a normal state before shipment of the vehicle 1 was.

Figure 10:
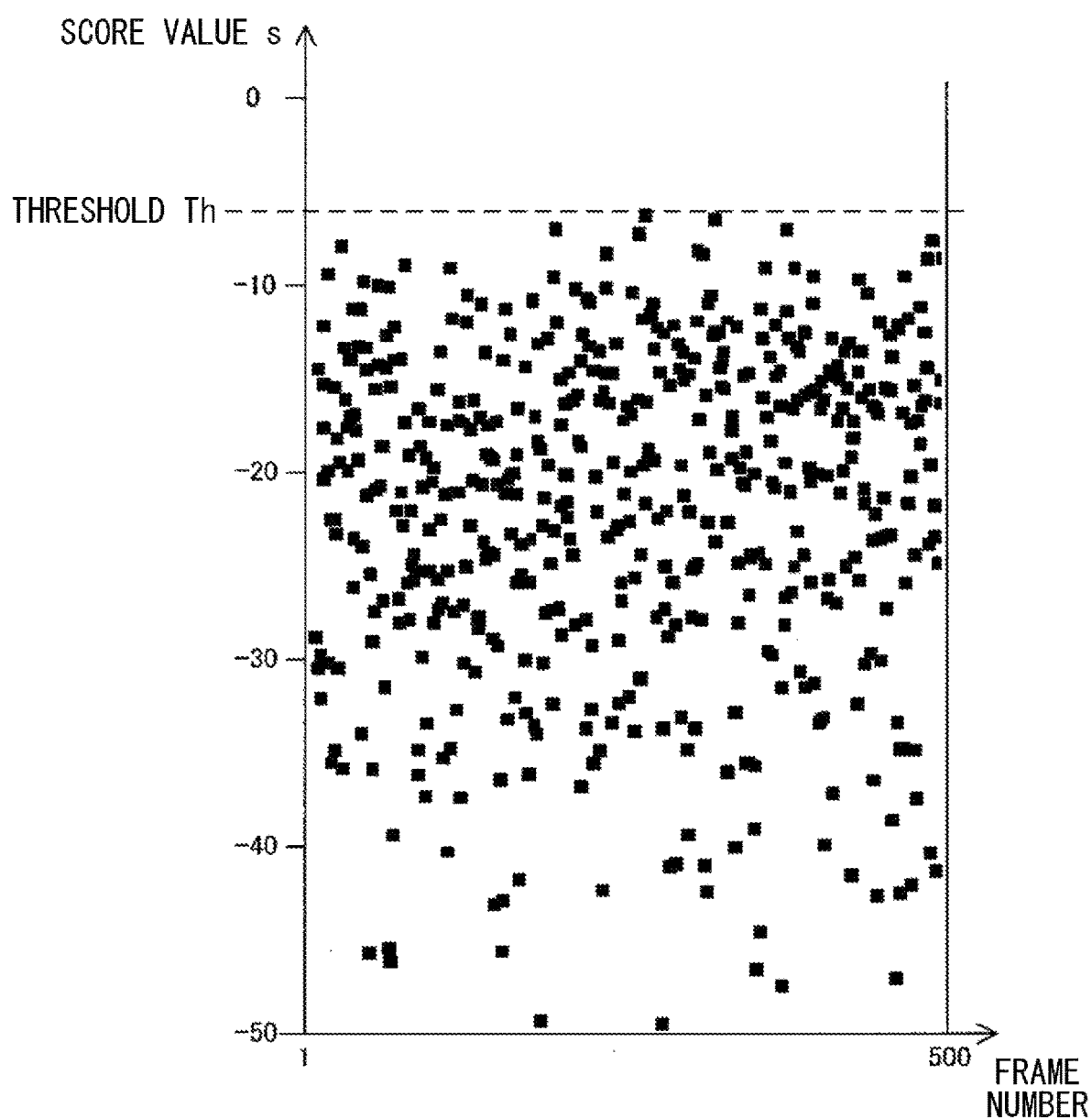
FIG. 10 shows another example of a distribution of score values calculated in the detection device according to the embodiment of the present disclosure.

FIG. 10 shows another example of a distribution of the score value calculated in the detection device according to the embodiment of the present disclosure. FIG. 10 shows score values s corresponding to 500 CAN frames and calculated by the calculation unit 220 in a state where a new apparatus has been connected to the CAN bus 13 after shipment of the vehicle 1.

With reference to FIG. 10, when a new apparatus has been connected to the CAN bus 13, score values s calculated by the calculation unit 220 become values less than the threshold Th.

The detection unit 240 outputs a determination result on an abnormality regarding the CAN bus 13, to the notification unit 250.

When the notification unit 250 has received from the detection unit 240 a determination result indicating that an abnormality regarding the CAN bus 13 has occurred, the notification unit 250 transmits alarm information indicating that an abnormality has occurred, to a higher-order device inside the vehicle 1 or outside the vehicle 1.

Operation Flow

Each device in the in-vehicle communication system according to the embodiment of the present disclosure includes a computer that includes a memory. An arithmetic processing unit such as a CPU in the computer reads out a program including a part or all of steps of the flowchart and sequence described below from the memory, and executes the program. The programs for the plurality of devices can be installed from outside, respectively. The programs for the plurality of devices are each distributed in a state of being stored in a storage medium.

Figure 11:
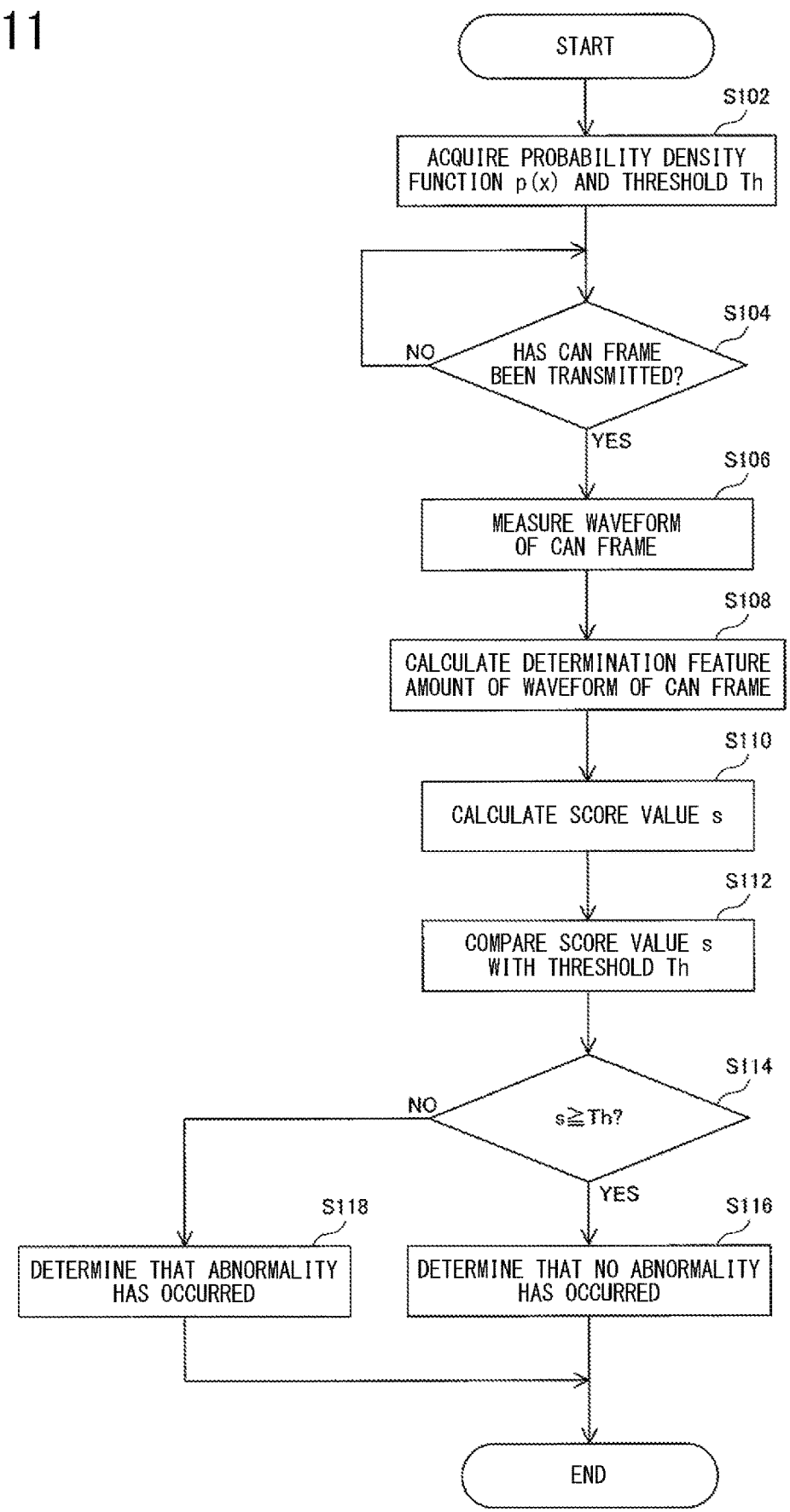
FIG. 11 is a flowchart describing an example of an operation procedure according to which the detection device in the in-vehicle system performs a detection process, according to the embodiment of the present disclosure.

FIG. 11 is a flowchart describing an example of an operation procedure according to which the detection device in the in-vehicle system performs the detection process, according to the embodiment of the present disclosure.

With reference to FIG. 11, first, the detection device 200 acquires a probability density function p(x) and a threshold Th (step S102).

Next, the detection device 200 waits for a CAN frame transmitted from a certain control device 122 (NO in step S104), and when having detected SOF of the CAN frame transmitted from a certain control device 122 (YES in step S104), the detection device 200 measures the signal waveform of the CAN frame. More specifically, the detection device 200 generates target data Sa, Sb in a rising period and a falling period of the CAN frame (step S106).

Next, the detection device 200 calculates a determination feature amount of the signal waveform of the CAN frame. More specifically, the detection device 200 calculates a determination feature amount by performing arithmetic operation using the generated target data Sa, Sb (step S108).

Next, based on the acquired probability density function p(x) and the calculated determination feature amount, the detection device 200 calculates a score value s (step S110).

Next, the detection device 200 compares the calculated score value s with the acquired threshold Th (step S112).

Next, when the score value s is not less than the threshold Th (YES in step S114), the detection device 200 determines that no abnormality regarding the CAN bus 13 has occurred (step S116).

Meanwhile, when the score value s is less than the threshold Th (NO in step S114), the detection device 200 determines that an abnormality regarding the CAN bus 13 has occurred (step S118).

Figure 12:
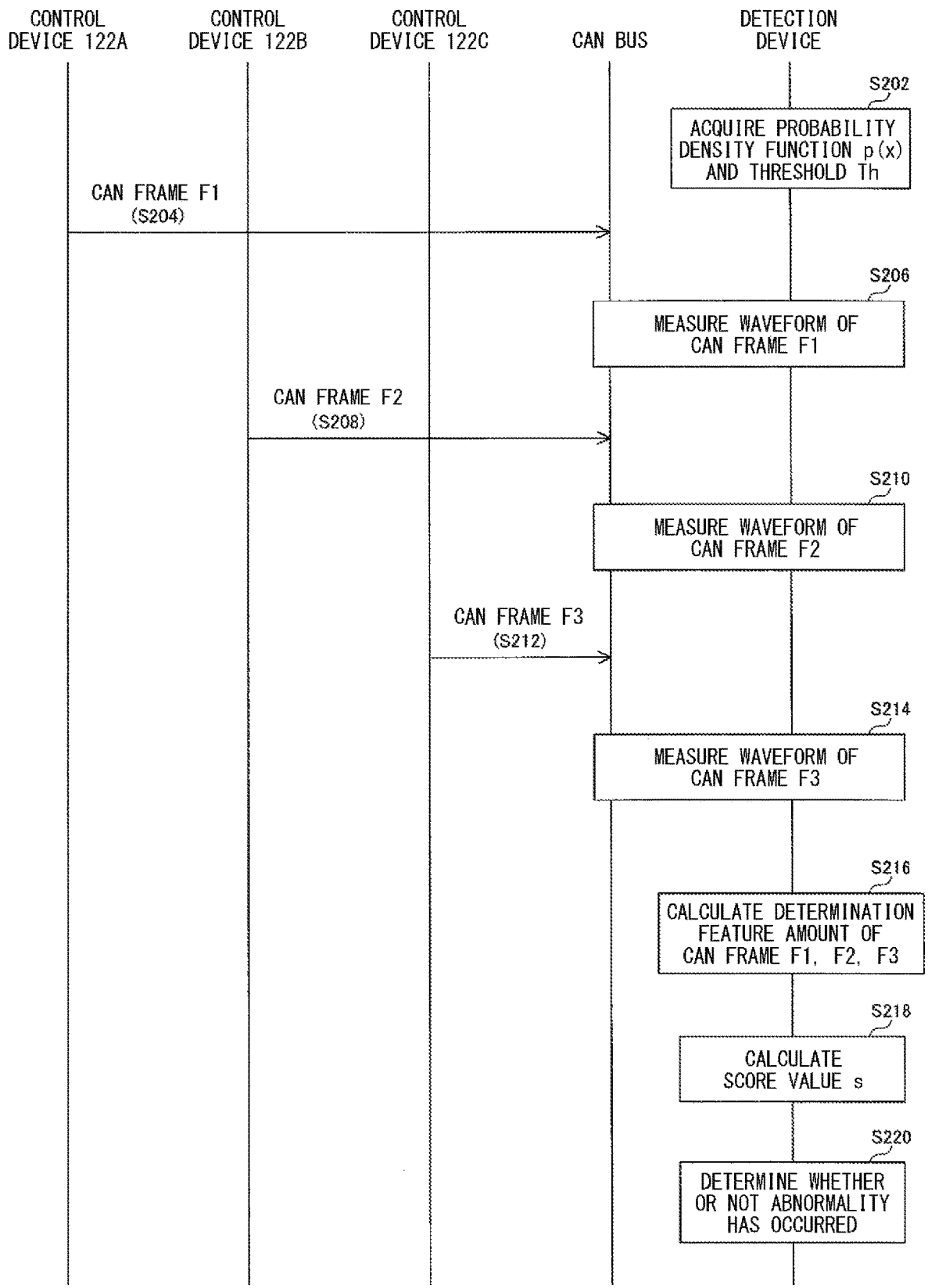
FIG. 12 shows an example of a sequence of the detection process performed in the in-vehicle system according to the embodiment of the present disclosure.

FIG. 12 shows an example of a sequence of the detection process performed in the in-vehicle system according to the embodiment of the present disclosure.

With reference to FIG. 12, first, the detection device 200 acquires a probability density function p(x) and a threshold Th (step S202).

Next, the control device 122A transmits a CAN frame F1 addressed to another control device 122 via a CAN bus 13 (step S204).

Next, when the detection device 200 has detected SOF of the CAN frame F1 transmitted from the control device 122A by monitoring the difference voltage Vd in the CAN bus 13, the detection device 200 measures the signal waveform of the CAN frame F1 (step S206).

Next, the control device 122B transmits a CAN frame F2 addressed to another control device 122 via the CAN bus 13 (step S208).

Next, when the detection device 200 has detected SOF of the CAN frame F2 transmitted from the control device 122B by monitoring the difference voltage Vd in the CAN bus 13, the detection device 200 measures the signal waveform of the CAN frame F2 (step S210).

Next, the control device 122C transmits a CAN frame F3 addressed to another control device 122 via the CAN bus 13 (step S212).

Next, when the detection device 200 has detected SOF of the CAN frame F3 transmitted from the control device 122C by monitoring the difference voltage Vd in the CAN bus 13, the detection device 200 measures the signal waveform of the CAN frame F3 (step S214).

Next, the detection device 200 calculates determination feature amounts of the signal waveforms of the CAN frames F1, F2, F3, respectively (step S216).

Next, based on the acquired probability density function p(x) and each calculated determination feature amount, the detection device 200 calculates score values s corresponding to the respective determination feature amounts (step S218).

Next, the detection device 200 compares the calculated three score values s with the threshold Th, and determines whether or not an abnormality regarding the CAN bus 13 has occurred, based on the comparison result. More specifically, when all of the three score values s are not less than the threshold Th, the detection device 200 determines that no abnormality regarding the CAN bus 13 has occurred. Meanwhile, when at least one of the three score values s is less than the threshold Th, the detection unit 240 determines that an abnormality regarding the CAN bus 13 has occurred (step S220).

In the in-vehicle system 301 according to the embodiment of the present disclosure, the detection device 200 is a device separate from the control device 122. However, the present disclosure is not limited thereto. The detection device 200 may be included in the control device 122 or the gateway device 101.

In the detection device 200 according to the embodiment of the present disclosure, the acquisition unit 230 acquires the probability density function p(x) and the threshold Th from the storage unit 260 in the detection device 200. However, the present disclosure is not limited thereto. The acquisition unit 230 may acquire the probability density function p(x) and the threshold Th from a storage unit outside the detection device 200.

In the detection device 200 according to the embodiment of the present disclosure, the detection unit 240 calculates a score value s, based on a reference distribution, i.e., the probability density function p(x) generated by using a GMM, and detects an abnormality regarding the CAN bus 13, based on a comparison result between the calculated score value s and the threshold. However, the present disclosure is not limited thereto. The detection unit 240 may detect an abnormality regarding the CAN bus 13 by using LOF (Local Outlier Factor), OCSVM (One-Class Support Vector Machine), or IF (Isolation Forest), for example.

In the detection device 200 according to the embodiment of the present disclosure, the calculation unit 220 performs arithmetic operation using target data Sa, Sb indicated by measurement information received from the measurement unit 210, thereby calculating, as a determination feature amount, at least two of mean, variance, skewness, kurtosis, irregularity by Krimphoff, irregularity by Jensen, spectrum crest factor, and root mean square. However, the present disclosure is not limited thereto. Instead of the feature amounts described above, the calculation unit 220 may calculate feature amounts other than the above as the determination feature amount. In addition to the feature amounts described above, the calculation unit 220 may calculate feature amounts other than the above as the determination feature amount.

In the detection device 200 according to the embodiment of the present disclosure, the measurement unit 210 measures a pulse signal waveform in a range from the Control field to the CRC field in a CAN frame. However, the present disclosure is not limited thereto. The measurement unit 210 may measure the pulse signal waveform in the ACK field in the CAN frame, for example. The measurement unit 210 may measure the signal waveform in a portion other than the rising portion or the falling portion in the CAN frame. The measurement unit 210 may measure at least one of the signal waveform in the rising portion and the signal waveform in the falling portion in the CAN frame.

In the detection device 200 according to the embodiment of the present disclosure, the detection unit 240 detects an abnormality regarding the CAN bus 13, based on the probability density function p(x) and a plurality of sets of determination feature amounts calculated for respective target control devices 122 by the calculation unit 220. However, the present disclosure is not limited thereto. The detection unit 240 may detect an abnormality regarding the CAN bus 13, based on the probability density function p(x) and one set of determination feature amount calculated by the calculation unit 220.

In the detection device 200 according to the embodiment of the present disclosure, the measurement unit 210 generates measurement information including ID of the control device 122 being the transmission source of the CAN frame and selected target data Sa, Sb, and outputs the generated measurement information to the calculation unit 220. However, the present disclosure is not limited thereto. The measurement unit 210 may generate measurement information that includes target data Sa, Sb and that does not include ID of the control device 122 being the transmission source of the CAN frame, and output the generated measurement information to the calculation unit 220.

In the detection device 200 according to the embodiment of the present disclosure, the calculation unit 220 generates calculation information including ID of the control device 122 being the transmission source of the CAN frame and a calculated determination feature amount, and outputs the generated calculation information to the detection unit 240. However, the present disclosure is not limited thereto. The calculation unit 220 may generate calculation information that includes a determination feature amount and that does not include ID of the control device 122 being the transmission source of the CAN frame, and output the generated calculation information to the detection unit 240.

In the detection device 200 according to the embodiment of the present disclosure, the detection unit 240 calculates three score values s, based on the respective values x of the determination feature amounts FA, FB, FC of the CAN frames transmitted from a plurality of target control devices 122, respectively, and detects an abnormality regarding the CAN bus 13, based on a comparison result between the calculated three score values s and the threshold Th. However, the present disclosure is not limited thereto. The detection unit 240 may calculate one score value s, based on the value x of a determination feature amount of a CAN frame transmitted from one target control device 122, and detect an abnormality regarding the CAN bus 13, based on a comparison result between the calculated score value s and the threshold Th.

More specifically, for example, every time the detection unit 240 receives from the calculation unit 220 calculation information that does not include ID of the control device 122 being the transmission source of the CAN frame, the detection unit 240 acquires a determination feature amount from the received calculation information, and calculates one score value s, based on the value x of the acquired determination feature amount. Then, based on a comparison result between the calculated score value s and the threshold Th, the detection unit 240 detects an abnormality regarding the CAN bus 13.

Meanwhile, there is a desire for a technology that can more accurately detect an abnormality regarding a CAN bus in an in-vehicle network, with a simple configuration.

For example, in the technology described in NON PATENT LITERATURE 1, in order to detect connection of an unauthorized apparatus in a network by using TDR, it is necessary to separately use a pulse signal generator that applies a pulse signal to the network. In addition, in the technology described in NON PATENT LITERATURE 1, when a process of detecting connection of an unauthorized apparatus is performed, it is necessary to stop communication in a CAN bus, for example.

In the technology described in PATENT LITERATURE 1, it is not easy to detect a minute change regarding a CAN bus, such as connection of a new apparatus to a CAN bus, for example. Thus, an abnormality regarding the CAN bus cannot be accurately detected in some cases.

In contrast to this, in the detection device 200 according to the embodiment of the present disclosure, the measurement unit 210 measures the signal waveform of a frame transmitted in a CAN bus 13. The calculation unit 220 calculates a plurality of kinds of feature amounts of the signal waveform measured by the measurement unit 210. The detection unit 240 detects an abnormality regarding the CAN bus 13, based on each feature amount calculated by the calculation unit 220.

In the in-vehicle system 301 according to the embodiment of the present disclosure, the control device 122 transmits a frame to another control device 122 via a CAN bus 13. The detection device 200 measures the signal waveform of the frame transmitted in the CAN bus 13. The detection device 200 calculates a plurality of kinds of feature amounts of the measured signal waveform. The detection device 200 detects an abnormality regarding the CAN bus 13, based on each calculated feature amount.

A detection method according to the embodiment of the present disclosure is a detection method to be performed in a detection device to be used in the in-vehicle network 12 including a CAN bus 13 and a plurality of control devices 122 connected to the CAN bus 13. In this detection method, first, the detection device 200 measures the signal waveform of a frame transmitted in the CAN bus 13. Next, the detection device 200 calculates a plurality of kinds of feature amounts of the measured signal waveform. Next, the detection device 200 detects an abnormality regarding the CAN bus 13, based on each calculated feature amount.

Thus, according to the configuration and method in which feature amounts of the signal waveform of a frame transmitted in a CAN bus 13 are focused on, and a plurality of kinds of feature amounts are calculated to detect an abnormality regarding the CAN bus 13, it is possible to detect a minute change regarding the CAN bus during, for example, operation without using a device or the like that applies a pulse signal to the CAN bus 13, for example.

Therefore, with the detection device, the in-vehicle system, and the detection method according to the embodiment of the present disclosure, an abnormality regarding a CAN bus in an in-vehicle network can be more accurately detected with a simple configuration.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

Additional Note 1

A detection device to be used in an in-vehicle network including a CAN bus and a plurality of function units connected to the CAN bus, the detection device comprising:
a measurement unit configured to measure a signal waveform of a frame transmitted in the CAN bus;
a calculation unit configured to calculate a plurality of kinds of feature amounts of the signal waveform measured by the measurement unit; and
a detection unit configured to detect an abnormality regarding the CAN bus, based on each of the feature amounts calculated by the calculation unit, wherein
the measurement unit, the calculation unit, and the detection unit are realized by a processor.

Additional Note 2

A detection device to be used in an in-vehicle network including a CAN bus and a plurality of function units connected to the CAN bus, the detection device comprising:
a measurement unit configured to measure a signal waveform of a frame transmitted in the CAN bus;
a calculation unit configured to calculate a plurality of kinds of feature amounts of the signal waveform measured by the measurement unit; and
a detection unit configured to detect an abnormality regarding the CAN bus, based on each of the feature amounts calculated by the calculation unit,
the detection device further including
an acquisition unit configured to acquire a probability density function being a distribution of each feature amount that has been generated in advance before a new apparatus is connected to the CAN bus, wherein
the detection unit calculates a score value of each feature amount by using each feature amount calculated by the calculation unit and the probability density function acquired by the acquisition unit, and detects an abnormality regarding the CAN bus, based on the calculated score value.

Additional Note 3

An in-vehicle system comprising:
a plurality of function units connected to a CAN bus; and a detection device, wherein
each function unit transmits a frame to another function unit via the CAN bus,
the detection device measures a signal waveform of the frame transmitted in the CAN bus,
the detection device calculates a plurality of kinds of feature amounts of the measured signal waveform,
the detection device detects an abnormality regarding the CAN bus, based on each of the calculated feature amounts, and
the function unit is a gateway device or an ECU.

Additional Note 4

An in-vehicle system comprising:
a plurality of function units connected to a CAN bus; and
a detection device, wherein
each function unit transmits a frame to another function unit via the CAN bus,
the detection device measures a signal waveform of the frame transmitted in the CAN bus,
the detection device calculates a plurality of kinds of feature amounts of the measured signal waveform,
the detection device detects an abnormality regarding the CAN bus, based on each of the calculated feature amounts,
the detection device acquires a probability density function being a distribution of each feature amount that has been generated in advance before a new apparatus is connected to the CAN bus, and
the detection device calculates a score value of each feature amount by using each calculated feature amount and the acquired probability density function, and detects an abnormality regarding the CAN bus, based on the calculated score value.

REFERENCE SIGNS LIST 1 vehicle
12 in-vehicle network
13 CAN bus
14 bus
101 gateway device
111 in-vehicle communication device
121 bus connection device group
122, 122A, 122B, 122C control device
200 detection device
210 measurement unit
220 calculation unit
230 acquisition unit
240 detection unit
250 notification unit
260 storage unit
301 in-vehicle system

The invention claimed is:

1. A detection device to be used in an in-vehicle network including a CAN (Controller Area Network) bus and a plurality of function units connected to the CAN bus, the detection device comprising:
a measurement unit configured to measure a signal waveform of a frame transmitted in the CAN bus;
a calculation unit configured to calculate a plurality of kinds of feature amounts of the signal waveform measured by the measurement unit; and
a detection unit configured to detect an abnormality regarding the CAN bus, based on each of the feature amounts calculated by the calculation unit, wherein
the measurement unit
detects a start of the frame,
determines, as a start position of a Control field in the frame, a position of the frame after a specific time elapsed from the start of the frame, and
measures a pulse signal waveform in a range from the start position of the Control field to a CRC (Cyclic Redundancy Check) field in the frame.

2. The detection device according to claim 1, wherein
the detection device further includes
an acquisition unit configured to acquire a reference distribution being a distribution of each feature amount that has been generated in advance, and
the detection unit detects an abnormality regarding the CAN bus, based on each feature amount calculated by the calculation unit and the reference distribution acquired by the acquisition unit.

3. The detection device according to claim 1, wherein
the calculation unit calculates, as the feature amount, at least two of mean, variance, skewness, kurtosis, irregularity by Krimphoff, irregularity by Jensen, spectrum crest factor, and root mean square, of voltage values obtained by sampling the signal waveform.

4. The detection device according to claim 1, wherein
the measurement unit measures the signal waveform of each of a plurality of the frames respectively transmitted from a plurality of the function units,
the calculation unit calculates a plurality of kinds of the feature amounts of each signal waveform measured by the measurement unit, and
the detection unit detects an abnormality regarding the CAN bus, based on the plurality of kinds of the feature amounts, of each signal waveform, calculated by the calculation unit.

5. An in-vehicle system comprising:
a plurality of function units connected to a CAN bus; and
a detection device, wherein
each function unit transmits a frame to another function unit via the CAN bus,
the detection device
detects a start of the frame transmitted in the CAN bus,
determines, as a start position of a Control field in the frame, a position of the frame after a specific time elapsed from the start of the frame, and
measures a pulse signal waveform in a range from the start position of the Control field to a CRC (Cyclic Redundancy Check) field in the frame,
the detection device calculates a plurality of kinds of feature amounts of the measured pulse signal waveform, and
the detection device detects an abnormality regarding the CAN bus, based on each of the calculated feature amounts.

6. A detection method to be performed in a detection device to be used in an in-vehicle network including a CAN bus and a plurality of function units connected to the CAN bus, the detection method comprising the steps of:
measuring a signal waveform of a frame transmitted in the CAN bus;
calculating a plurality of kinds of feature amounts of the measured signal waveform; and
detecting an abnormality regarding the CAN bus, based on each of the calculated feature amounts, wherein
the measuring includes
detecting a start of the frame, determining, as a start position of a Control field in the frame, a position of the frame after a specific time elapsed from the start of the frame, and measuring a pulse signal waveform in a range from the start of the Control field to a CRC (Cyclic Redundancy Check) field in the frame.

\* \* \* \* \*